United States Patent
Vankamamidi et al.

(10) Patent No.: US 11,657,008 B2
(45) Date of Patent: May 23, 2023

(54) SYSTEM AND METHOD FOR STORAGE TIERING OPTIMIZATION

(71) Applicant: EMC IP Holding Company, LLC, Hopkinton, MA (US)

(72) Inventors: Vamsi K. Vankamamidi, Hopkinton, MA (US); Shaul Dar, Petach Tikva (IL)

(73) Assignee: EMC IP Holding Company, LLC, Hopkinton, MA (US)

( * ) Notice: Subject to any disclaimer, the term of this patent is extended or adjusted under 35 U.S.C. 154(b) by 0 days.

(21) Appl. No.: 17/390,220

(22) Filed: Jul. 30, 2021

(65) Prior Publication Data

US 2023/0036528 A1 Feb. 2, 2023

(51) Int. Cl.
G06F 13/16 (2006.01)
(52) U.S. Cl.
CPC ............... *G06F 13/1668* (2013.01)
(58) Field of Classification Search
None
See application file for complete search history.

(56) References Cited

U.S. PATENT DOCUMENTS

| | | | |
|---|---|---|---|
| 10,684,944 B1 * | 6/2020 | Can | G06F 3/067 |
| 11,137,926 B1 * | 10/2021 | Pendharkar | G06F 3/0611 |
| 2019/0043201 A1 * | 2/2019 | Strong | G06V 10/771 |
| 2019/0243559 A1 * | 8/2019 | Raut | G06F 3/0613 |
| 2019/0324899 A1 * | 10/2019 | Kulkarni | G06F 3/0653 |
| 2020/0242031 A1 * | 7/2020 | Dalmatov | G06F 12/128 |
| 2022/0113985 A1 * | 4/2022 | Kanjirathinkal | G06F 11/0751 |

* cited by examiner

*Primary Examiner* — Michael Sun
(74) *Attorney, Agent, or Firm* — Brian J. Colandreo; Heath M. Sargeant; Holland & Knight LLP

(57) ABSTRACT

A method, computer program product, and computing system for receiving a plurality of input/output (IO) requests at a storage system. One or more IO properties may be extracted from the plurality of IO requests. The one or more IO properties may be processed, using one or more machine learning models, to define an access temperature value for one or more storage objects of the storage system. The one or more storage objects may be tiered between a plurality of storage tiers of the storage system, based upon, at least in part, the access temperature values defined for the one or more storage objects of the storage system and one or more tiering policies.

18 Claims, 6 Drawing Sheets

SYSTEM AND METHOD FOR STORAGE TIERING OPTIMIZATION

BACKGROUND

Storing and safeguarding electronic content may be beneficial in modern business and elsewhere. Accordingly, various methodologies may be employed to protect and distribute such electronic content.

For example, storage systems support multiple media types of varying cost/performance characteristics (e.g. HDDs, SSDs, NVRAM) and use data placement (tiering) techniques to best match the performance requirements of the data with the performance characteristics of the media. However, traditional tiering mechanisms and policies suffer from several limitations. For example, the amount of memory needed to maintain a heat-map for all the storage in the storage system is prohibitively expensive. One common technique to overcome the memory constraint is to decrease the granularity of storage objects used for tiering. However, this approach includes an "averaging effect" where a loss in the visibility of hot and cold blocks within a storage object results in hot-blocks getting down-tiered because of cold-blocks in the extent and vice-versa (i.e. cold-blocks getting up-tiered because of hot-blocks in the extent). This leads to tiering inefficiencies. Additionally, "thrashing" may occurs when the amount of hot-data is larger than the high-tier size. Further, traditional heat-maps used for tiering do not have the concept of "periodicity". As a result, conventional tiering approaches cannot adapt to future access-patterns.

SUMMARY OF DISCLOSURE

In one example implementation, a computer-implemented method executed on a computing device may include, but is not limited to, receiving a plurality of input/output (IO) requests at a storage system. One or more IO properties may be extracted from the plurality of IO requests. The one or more IO properties may be processed, using one or more machine learning models, to define an access temperature value for one or more storage objects of the storage system. The one or more storage objects may be tiered between a plurality of storage tiers of the storage system, based upon, at least in part, the access temperature values defined for the one or more storage objects of the storage system and one or more tiering policies.

One or more of the following example features may be included. One or more machine learning features may be generated from the one or more IO properties. Generating the one or more machine learning features from the one or more IO properties may include generating the one or more machine learning features from the one or more IO properties using one or more machine learning models. The one or more machine learning features may include: a re-access block count; and one or more of: a re-access interval count for one or more blocks that have been re-accessed during a predefined interval; and a re-access time gap between re-accessing for the one or more blocks that have been re-accessed. Tiering the one or more storage objects between a plurality of storage tiers of the storage system, based upon, at least in part, the access temperature values defined for the one or more storage objects of the storage system may include defining a plurality of tiering thresholds for the plurality of storage tiers based upon, at least in part, the access temperature values defined for the one or more storage objects. Tiering the one or more storage objects between a plurality of storage tiers of the storage system, based upon, at least in part, the access temperature values defined for the one or more storage objects of the storage system may include dynamically adjusting the plurality of tiering thresholds for the plurality of storage tiers based upon, at least in part, performance of the plurality of storage tiers. The one or more machine learning models may be configured for one or more of: offline training and continuous training.

In another example implementation, a computer program product resides on a computer readable medium that has a plurality of instructions stored on it. When executed by a processor, the instructions cause the processor to perform operations that may include, but are not limited to, receiving a plurality of input/output (IO) requests at a storage system. One or more IO properties may be extracted from the plurality of IO requests. The one or more IO properties may be processed, using one or more machine learning models, to define an access temperature value for one or more storage objects of the storage system. The one or more storage objects may be tiered between a plurality of storage tiers of the storage system, based upon, at least in part, the access temperature values defined for the one or more storage objects of the storage system and one or more tiering policies.

One or more of the following example features may be included. One or more machine learning features may be generated from the one or more IO properties. Generating the one or more machine learning features from the one or more IO properties may include generating the one or more machine learning features from the one or more IO properties using one or more machine learning models. The one or more machine learning features may include: a re-access block count; and one or more of: a re-access interval count for one or more blocks that have been re-accessed during a predefined interval; and a re-access time gap between re-accessing for the one or more blocks that have been re-accessed. Tiering the one or more storage objects between a plurality of storage tiers of the storage system, based upon, at least in part, the access temperature values defined for the one or more storage objects of the storage system may include defining a plurality of tiering thresholds for the plurality of storage tiers based upon, at least in part, the access temperature values defined for the one or more storage objects. Tiering the one or more storage objects between a plurality of storage tiers of the storage system, based upon, at least in part, the access temperature values defined for the one or more storage objects of the storage system may include dynamically adjusting the plurality of tiering thresholds for the plurality of storage tiers based upon, at least in part, performance of the plurality of storage tiers. The one or more machine learning models may be configured for one or more of: offline training and continuous training.

In another example implementation, a computing system includes at least one processor and at least one memory architecture coupled with the at least one processor, wherein the at least one processor is configured to receive a plurality of input/output (IO) requests at a storage system. The at least one processor may be further configured to extract one or more IO properties from the plurality of IO requests. The at least one processor may be further configured to process, using one or more machine learning models, the one or more IO properties to define an access temperature value for one or more storage objects of the storage system. The at least one processor may be further configured to tier the one or more storage objects between a plurality of storage tiers of the storage system, based upon, at least in part, the access temperature values defined for the one or more storage objects of the storage system and one or more tiering policies.

One or more of the following example features may be included. One or more machine learning features may be generated from the one or more IO properties. Generating the one or more machine learning features from the one or more IO properties may include generating the one or more machine learning features from the one or more IO properties using one or more machine learning models. The one or more machine learning features may include: a re-access block count; and one or more of: a re-access interval count for one or more blocks that have been re-accessed during a predefined interval; and a re-access time gap between re-accessing for the one or more blocks that have been re-accessed. Tiering the one or more storage objects between a plurality of storage tiers of the storage system, based upon, at least in part, the access temperature values defined for the one or more storage objects of the storage system may include defining a plurality of tiering thresholds for the plurality of storage tiers based upon, at least in part, the access temperature values defined for the one or more storage objects. Tiering the one or more storage objects between a plurality of storage tiers of the storage system, based upon, at least in part, the access temperature values defined for the one or more storage objects of the storage system may include dynamically adjusting the plurality of tiering thresholds for the plurality of storage tiers based upon, at least in part, performance of the plurality of storage tiers. The one or more machine learning models may be configured for one or more of: offline training and continuous training.

The details of one or more example implementations are set forth in the accompanying drawings and the description below. Other possible example features and/or possible example advantages will become apparent from the description, the drawings, and the claims. Some implementations may not have those possible example features and/or possible example advantages, and such possible example features and/or possible example advantages may not necessarily be required of some implementations.

BRIEF DESCRIPTION OF THE DRAWINGS

Like reference symbols in the various drawings indicate like elements.

DETAILED DESCRIPTION

Figure 1:
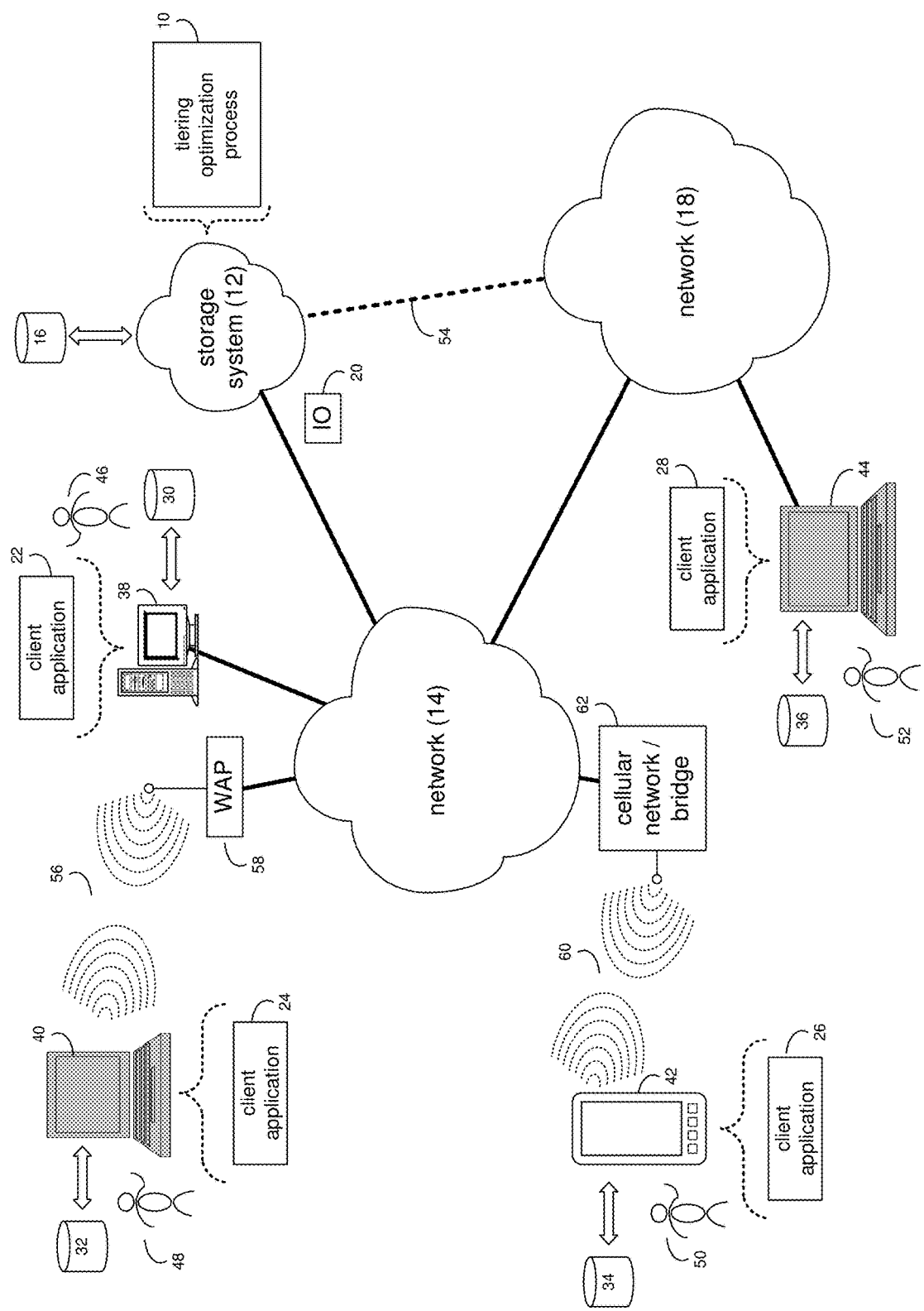
FIG. 1 is an example diagrammatic view of a storage system and a tiering optimization process coupled to a distributed computing network according to one or more example implementations of the disclosure.

System Overview:

Referring to FIG. 1, there is shown tiering optimization process 10 that may reside on and may be executed by storage system 12, which may be connected to network 14 (e.g., the Internet or a local area network). Examples of storage system 12 may include, but are not limited to: a Network Attached Storage (NAS) system, a Storage Area Network (SAN), a personal computer with a memory system, a server computer with a memory system, and a cloud-based device with a memory system.

As is known in the art, a SAN may include one or more of a personal computer, a server computer, a series of server computers, a mini computer, a mainframe computer, a RAID device and a NAS system. The various components of storage system 12 may execute one or more operating systems, examples of which may include but are not limited to: Microsoft® Windows®; Mac® OS X®; Red Hat® Linux®, Windows® Mobile, Chrome OS, Blackberry OS, Fire OS, or a custom operating system. (Microsoft and Windows are registered trademarks of Microsoft Corporation in the United States, other countries or both; Mac and OS X are registered trademarks of Apple Inc. in the United States, other countries or both; Red Hat is a registered trademark of Red Hat Corporation in the United States, other countries or both; and Linux is a registered trademark of Linus Torvalds in the United States, other countries or both).

The instruction sets and subroutines of tiering optimization process 10, which may be stored on storage device 16 included within storage system 12, may be executed by one or more processors (not shown) and one or more memory architectures (not shown) included within storage system 12. Storage device 16 may include but is not limited to: a hard disk drive; a tape drive; an optical drive; a RAID device; a random access memory (RAM); a read-only memory (ROM); and all forms of flash memory storage devices. Additionally/alternatively, some portions of the instruction sets and subroutines of tiering optimization process 10 may be stored on storage devices (and/or executed by processors and memory architectures) that are external to storage system 12.

Network 14 may be connected to one or more secondary networks (e.g., network 18), examples of which may include but are not limited to: a local area network; a wide area network; or an intranet, for example.

Various IO requests (e.g. IO request 20) may be sent from client applications 22, 24, 26, 28 to storage system 12. Examples of IO request 20 may include but are not limited to data write requests (e.g., a request that content be written to storage system 12) and data read requests (e.g., a request that content be read from storage system 12).

The instruction sets and subroutines of client applications 22, 24, 26, 28, which may be stored on storage devices 30, 32, 34, 36 (respectively) coupled to client electronic devices 38, 40, 42, 44 (respectively), may be executed by one or more processors (not shown) and one or more memory architectures (not shown) incorporated into client electronic devices 38, 40, 42, 44 (respectively). Storage devices 30, 32, 34, 36 may include but are not limited to: hard disk drives; tape drives; optical drives; RAID devices; random access memories (RAM); read-only memories (ROM), and all forms of flash memory storage devices. Examples of client electronic devices 38, 40, 42, 44 may include, but are not limited to, personal computer 38, laptop computer 40, smartphone 42, notebook computer 44, a server (not shown), a data-enabled, cellular telephone (not shown), and a dedicated network device (not shown).

Users 46, 48, 50, 52 may access storage system 12 directly through network 14 or through secondary network 18. Further, storage system 12 may be connected to network 14 through secondary network 18, as illustrated with link line 54.

The various client electronic devices may be directly or indirectly coupled to network 14 (or network 18). For example, personal computer 38 is shown directly coupled to network 14 via a hardwired network connection. Further, notebook computer 44 is shown directly coupled to network 18 via a hardwired network connection. Laptop computer 40 is shown wirelessly coupled to network 14 via wireless communication channel 56 established between laptop computer 40 and wireless access point (e.g., WAP) 58, which is shown directly coupled to network 14. WAP 58 may be, for example, an IEEE 802.11a, 802.11b, 802.11g, 802.11n, Wi-Fi, and/or Bluetooth device that is capable of establishing wireless communication channel 56 between laptop computer 40 and WAP 58. Smartphone 42 is shown wirelessly coupled to network 14 via wireless communication channel 60 established between smartphone 42 and cellular network/bridge 62, which is shown directly coupled to network 14.

Client electronic devices 38, 40, 42, 44 may each execute an operating system, examples of which may include but are not limited to Microsoft® Windows®; Mac® OS X®; Red Hat® Linux®, Windows® Mobile, Chrome OS, Blackberry OS, Fire OS, or a custom operating system. (Microsoft and Windows are registered trademarks of Microsoft Corporation in the United States, other countries or both; Mac and OS X are registered trademarks of Apple Inc. in the United States, other countries or both; Red Hat is a registered trademark of Red Hat Corporation in the United States, other countries or both; and Linux is a registered trademark of Linus Torvalds in the United States, other countries or both).

In some implementations, as will be discussed below in greater detail, a tiering optimization process, such as tiering optimization process 10 of FIG. 1, may include but is not limited to, receiving a plurality of input/output (IO) requests at a storage system. One or more IO properties may be extracted from the plurality of IO requests. The one or more IO properties may be processed, using one or more machine learning models, to define an access temperature value for one or more storage objects of the storage system. The one or more storage objects may be tiered between a plurality of storage tiers of the storage system, based upon, at least in part, the access temperature values defined for the one or more storage objects of the storage system.

For example purposes only, storage system 12 will be described as being a network-based storage system that includes a plurality of electro-mechanical backend storage devices. However, this is for example purposes only and is not intended to be a limitation of this disclosure, as other configurations are possible and are considered to be within the scope of this disclosure.

Figure 2:
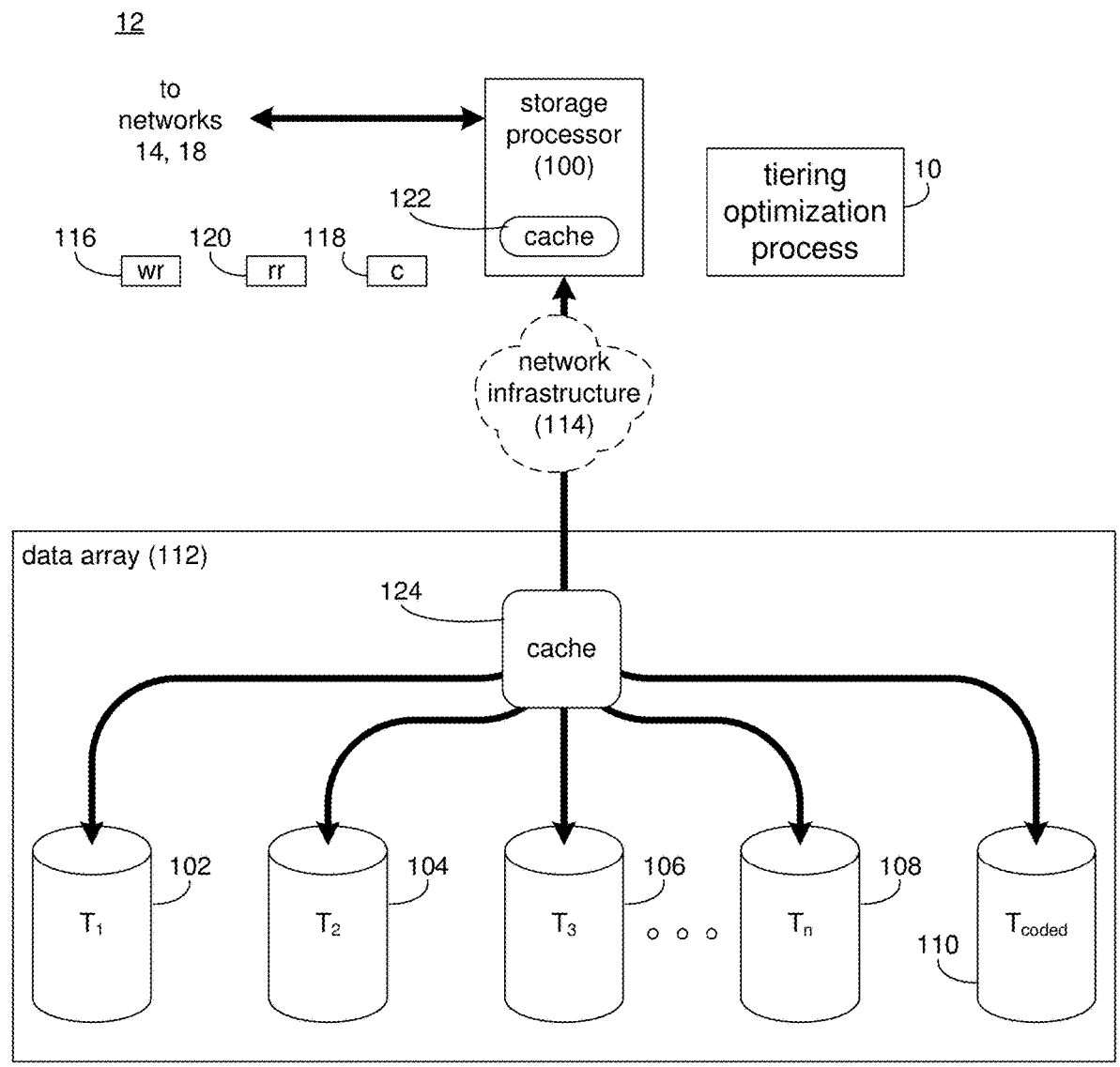
FIG. 2 is an example diagrammatic view of the storage system of FIG. 1 according to one or more example implementations of the disclosure.
Figure 3:
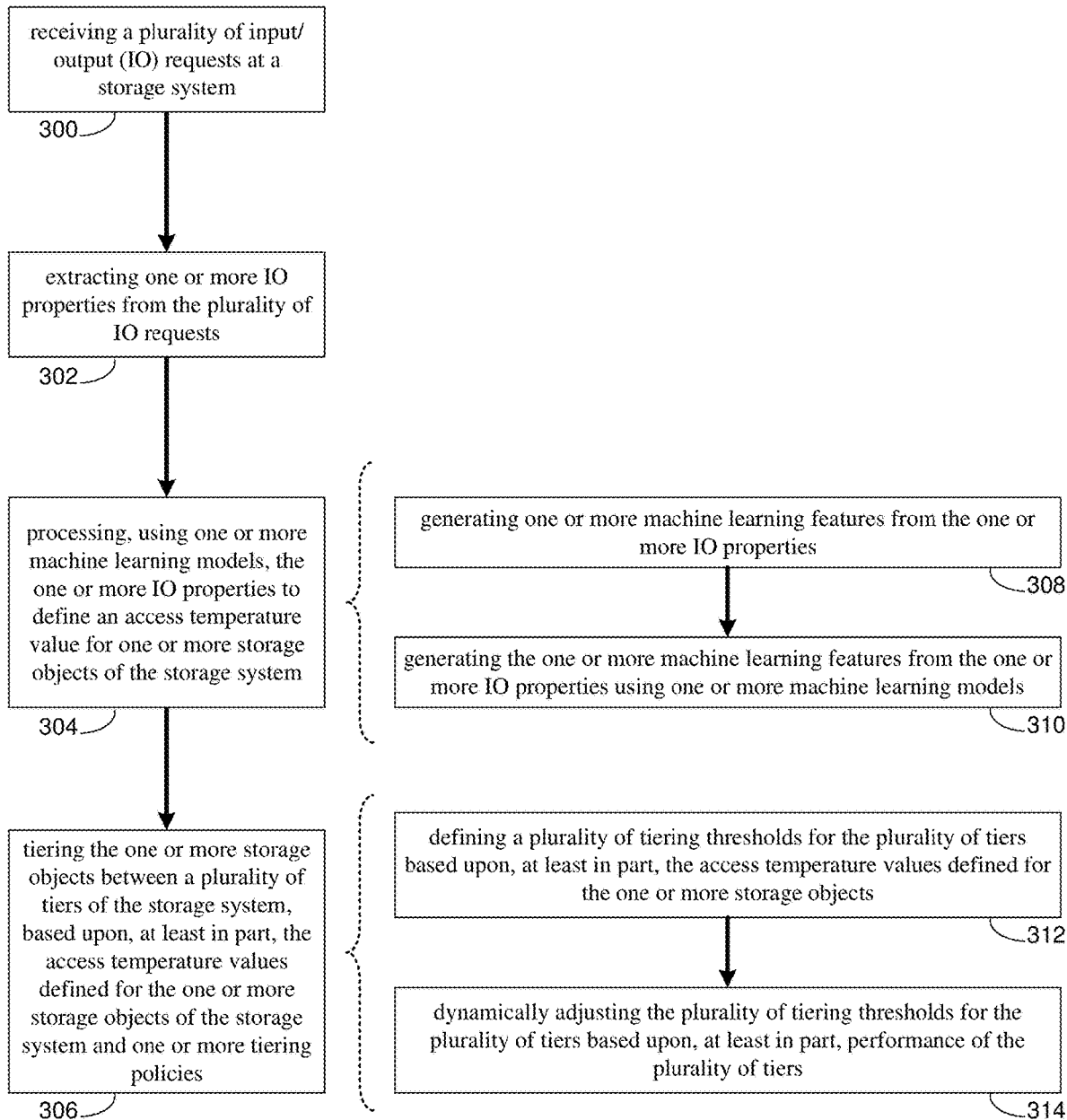
FIG. 3 is an example flowchart of tiering optimization process according to one or more example implementations of the disclosure.

The Storage System:

Referring also to FIG. 2, storage system 12 may include storage processor 100 and a plurality of storage targets T 1-n (e.g., storage targets 102, 104, 106, 108). Storage targets 102, 104, 106, 108 may be configured to provide various levels of performance and/or high availability. For example, one or more of storage targets 102, 104, 106, 108 may be configured as a RAID 0 array, in which data is striped across storage targets. By striping data across a plurality of storage targets, improved performance may be realized. However, RAID 0 arrays do not provide a level of high availability. Accordingly, one or more of storage targets 102, 104, 106, 108 may be configured as a RAID 1 array, in which data is mirrored between storage targets. By mirroring data between storage targets, a level of high availability is achieved as multiple copies of the data are stored within storage system 12.

While storage targets 102, 104, 106, 108 are discussed above as being configured in a RAID 0 or RAID 1 array, this is for example purposes only and is not intended to be a limitation of this disclosure, as other configurations are possible. For example, storage targets 102, 104, 106, 108 may be configured as a RAID 3, RAID 4, RAID 5 or RAID 6 array.

While in this particular example, storage system 12 is shown to include four storage targets (e.g. storage targets 102, 104, 106, 108), this is for example purposes only and is not intended to be a limitation of this disclosure. Specifically, the actual number of storage targets may be increased or decreased depending upon e.g., the level of redundancy/performance/capacity required.

Storage system 12 may also include one or more coded targets 110. As is known in the art, a coded target may be used to store coded data that may allow for the regeneration of data lost/corrupted on one or more of storage targets 102, 104, 106, 108. An example of such a coded target may include but is not limited to a hard disk drive that is used to store parity data within a RAID array.

While in this particular example, storage system 12 is shown to include one coded target (e.g., coded target 110), this is for example purposes only and is not intended to be a limitation of this disclosure. Specifically, the actual number of coded targets may be increased or decreased depending upon e.g. the level of redundancy/performance/capacity required.

Examples of storage targets 102, 104, 106, 108 and coded target 110 may include one or more electro-mechanical hard disk drives and/or solid-state/flash devices, wherein a combination of storage targets 102, 104, 106, 108 and coded target 110 and processing/control systems (not shown) may form data array 112.

The manner in which storage system 12 is implemented may vary depending upon e.g. the level of redundancy/performance/capacity required. For example, storage system 12 may be a RAID device in which storage processor 100 is a RAID controller card and storage targets 102, 104, 106, 108 and/or coded target 110 are individual "hot-swappable" hard disk drives. Another example of such a RAID device may include but is not limited to an NAS device. Alternatively, storage system 12 may be configured as a SAN, in which storage processor 100 may be e.g., a server computer and each of storage targets 102, 104, 106, 108 and/or coded target 110 may be a RAID device and/or computer-based hard disk drives. Further still, one or more of storage targets 102, 104, 106, 108 and/or coded target 110 may be a SAN.

In the event that storage system 12 is configured as a SAN, the various components of storage system 12 (e.g. storage processor 100, storage targets 102, 104, 106, 108, and coded target 110) may be coupled using network infrastructure 114, examples of which may include but are not limited to an Ethernet (e.g., Layer 2 or Layer 3) network, a fiber channel network, an InfiniBand network, or any other circuit switched/packet switched network.

Storage system 12 may execute all or a portion of tiering optimization process 10. The instruction sets and subroutines of tiering optimization process 10, which may be stored on a storage device (e.g., storage device 16) coupled to storage processor 100, may be executed by one or more processors (not shown) and one or more memory architectures (not shown) included within storage processor 100. Storage device 16 may include but is not limited to: a hard disk drive; a tape drive; an optical drive; a RAID device; a random access memory (RAM); a read-only memory (ROM); and all forms of flash memory storage devices. As discussed above, some portions of the instruction sets and subroutines of tiering optimization process 10 may be stored on storage devices (and/or executed by processors and memory architectures) that are external to storage system 12.

As discussed above, various IO requests (e.g. IO request 20) may be generated. For example, these IO requests may be sent from client applications 22, 24, 26, 28 to storage system 12. Additionally/alternatively and when storage processor 100 is configured as an application server, these IO requests may be internally generated within storage processor 100. Examples of IO request 20 may include but are not limited to data write request 116 (e.g., a request that content 118 be written to storage system 12) and data read request 120 (i.e. a request that content 118 be read from storage system 12).

During operation of storage processor 100, content 118 to be written to storage system 12 may be processed by storage processor 100. Additionally/alternatively and when storage processor 100 is configured as an application server, content 118 to be written to storage system 12 may be internally generated by storage processor 100.

Storage processor 100 may include frontend cache memory system 122. Examples of frontend cache memory system 122 may include but are not limited to a volatile, solid-state, cache memory system (e.g., a dynamic RAM cache memory system) and/or a non-volatile, solid-state, cache memory system (e.g., a flash-based, cache memory system).

Storage processor 100 may initially store content 118 within frontend cache memory system 122. Depending upon the manner in which frontend cache memory system 122 is configured, storage processor 100 may immediately write content 118 to data array 112 (if frontend cache memory system 122 is configured as a write-through cache) or may subsequently write content 118 to data array 112 (if frontend cache memory system 122 is configured as a write-back cache).

Data array 112 may include backend cache memory system 124. Examples of backend cache memory system 124 may include but are not limited to a volatile, solid-state, cache memory system (e.g., a dynamic RAM cache memory system) and/or a non-volatile, solid-state, cache memory system (e.g., a flash-based, cache memory system). During operation of data array 112, content 118 to be written to data array 112 may be received from storage processor 100. Data array 112 may initially store content 118 within backend cache memory system 124 prior to being stored on e.g. one or more of storage targets 102, 104, 106, 108, and coded target 110.

As discussed above, the instruction sets and subroutines of tiering optimization process 10, which may be stored on storage device 16 included within storage system 12, may be executed by one or more processors (not shown) and one or more memory architectures (not shown) included within storage system 12. Accordingly, in addition to being executed on storage processor 100, some or all of the instruction sets and subroutines of tiering optimization process 10 may be executed by one or more processors (not shown) and one or more memory architectures (not shown) included within data array 112.

Further and as discussed above, during the operation of data array 112, content (e.g., content 118) to be written to data array 112 may be received from storage processor 100 and initially stored within backend cache memory system 124 prior to being stored on e.g. one or more of storage targets 102, 104, 106, 108, 110. Accordingly, during use of data array 112, backend cache memory system 124 may be populated (e.g., warmed) and, therefore, subsequent read requests may be satisfied by backend cache memory system 124 (e.g., if the content requested in the read request is present within backend cache memory system 124), thus avoiding the need to obtain the content from storage targets 102, 104, 106, 108, 110 (which would typically be slower).

The Tiering Optimization Process:

Referring also to the examples of FIGS. 3-6 and in some implementations, tiering optimization process 10 may receive 300 a plurality of input/output (IO) requests at a storage system. One or more IO properties may be extracted 302 from the plurality of IO requests. The one or more IO properties may be processed 304, using one or more machine learning models, to define an access temperature value for one or more storage objects of the storage system. The one or more storage objects may be tiered 306 between a plurality of storage tiers of the storage system, based upon, at least in part, the access temperature values defined for the one or more storage objects of the storage system.

As will be discussed in greater detail below, implementations of the present disclosure may allow for machine learning, and specifically regression models, to predict the future "temperature" of storage objects (i.e., a likelihood that a storage object will be accessed within a particular time frame), which can lead to better tiering efficiency (i.e., higher input/output operations per second (IOPS), lower latency, better QoS). For example, storage systems support multiple media types of varying cost/performance characteristics (e.g. HDDs, SSDs, NVRAM) and use data placement (tiering) techniques to best match the performance requirements of the data with the performance characteristics of the media. As will be discussed in greater detail below, tiering optimization process 10 may optimize these data-placement techniques to improve the overall cost/performance characteristics of the storage system. That is, the storage system may be able to provide the performance close to high-performance media type (e.g. SSDs) at a cost close to low-performance media type (e.g. HDDs).

Figure 4:
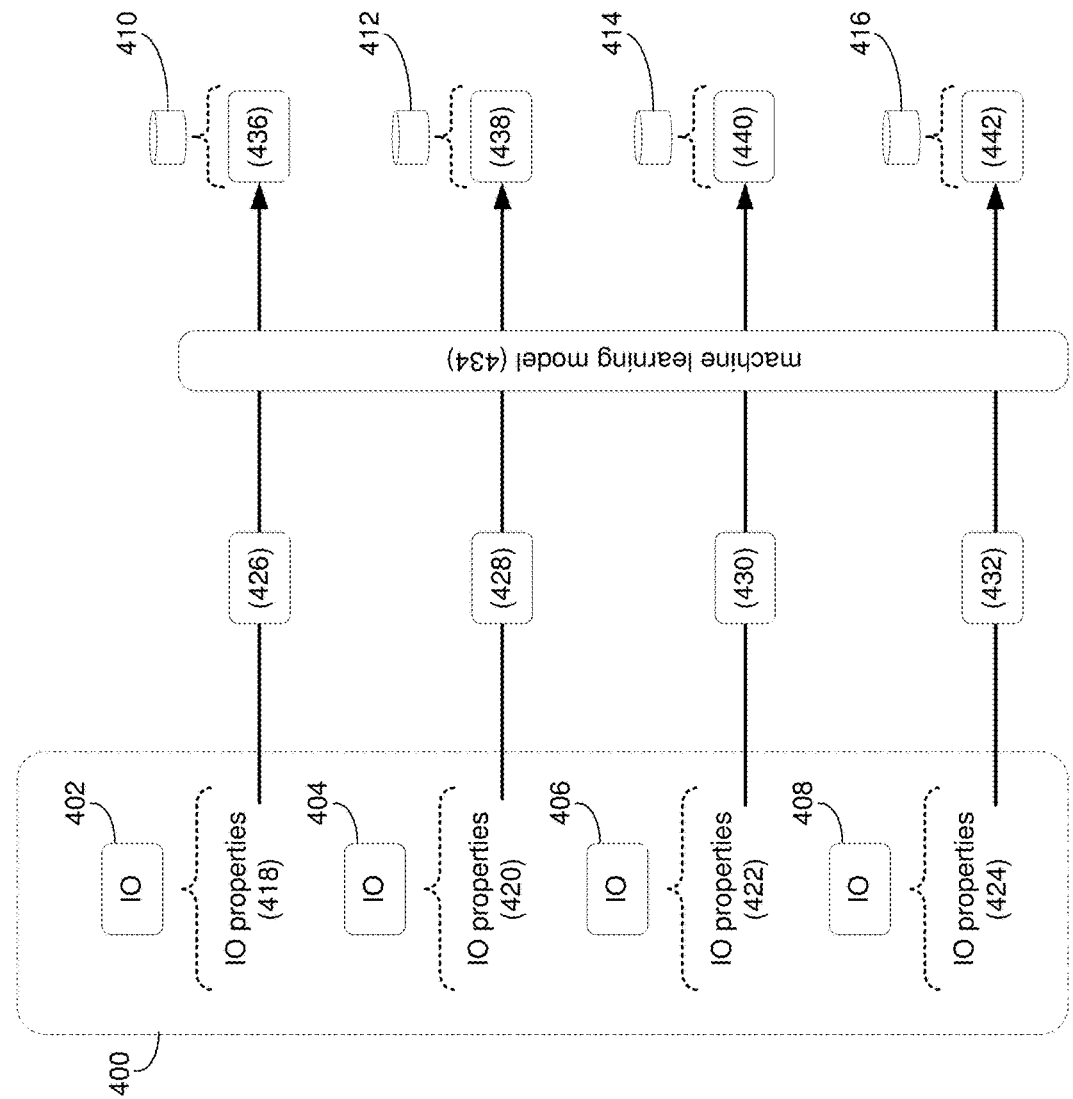
FIGS. 4-5 are example diagrammatic views of the storage system of FIG. 1 according to one or more example implementations of the disclosure.

In some implementations, tiering optimization process 10 may receive 300 a plurality of input/output (IO) requests at a storage system. Referring also to FIG. 4 and in some implementations, tiering optimization process 10 may receive 300 a plurality of IO requests (e.g., plurality of IO requests 400). In some implementations, plurality of IO requests 400 may include one or more IO requests (e.g., IO requests 402, 404, 406, 408). While an example of e.g., four IO requests is shown for plurality of IO requests 400 in FIG. 4, it will be appreciated that any number of IO requests may be included within the plurality of IO requests, within the scope of the present disclosure.

IO requests may be configured to perform various operations on one or more storage objects. In some implementations, a storage object may include volumes, Logical Unit Numbers (LUNs), files, or parts thereof that may be defined e.g. by offsets or address ranges (e.g., sub-LUNs, storage extents, and/or slices). In one example, the one or more storage objects may include one or more storage extents. A storage extent may include a collection of storage blocks or an address range of memory that exhibits a similar access pattern. For example, suppose storage system 12 includes e.g., 1 petabyte (PB) primary storage comprising 4 kilobyte (KB) blocks. In this example, storage system 12 would include 250 billion blocks. Defining and maintaining machine learning features and performing machine learning with such a large number of items is cost prohibitive. By working with storage extents (e.g. of size 2 megabytes (MB)), tiering optimization process 10 may address this scale of storage objects. While an example of a storage extent of e.g., 2 MB has been described, it will be appreciate that a storage extent may include any number of storage blocks of any size within the scope of the present disclosure.

Referring again to FIG. 4, IO request 402 may include a request to perform an operation on a first storage extent (e.g., storage extent 410); IO request 404 may include a request to perform an operation on a second storage extent (e.g., storage extent 412); IO request 406 may include a request to perform an operation on a third storage extent (e.g., storage extent 414); and IO request 408 may include a request to perform an operation on a fourth storage extent (e.g., storage extent 416). While four separate storage extents have been described, it will be appreciated that this is for example purposes only and that any number of IO requests may be received for any number of storage extents or other storage objects within the present disclosure. As will be discussed in greater detail below, the plurality of IO requests may be utilized, at least in part, to train a machine learning model to optimize the tiering of storage objects between a plurality of storage tiers.

In some implementations, tiering optimization process 10 may extract 302 one or more IO properties from the plurality of IO requests. For example, tiering optimization process 10 may extract 302 salient data elements (e.g., one or more IO properties) such as volume ID, timestamp, IO command type (e.g. read, write, unmap, etc.), LBA (i.e., an offset in the data path's thin address space), length, pattern (e.g., sequential, random, caterpillar, IO-stride), etc. that may be used as basic features in the training of and/or implementation of a machine learning model. In this manner, tiering optimization process 10 may extract 302 various IO properties associated with the plurality of IO requests.

In some implementations, tiering optimization process 10 may aggregate the one or more IO properties periodically to optimize for memory/storage requirements and/or CPU costs. Additionally, tiering optimization process 10 may use a sampling approach where IO properties for every "n"th IO request are extracted. In some implementations, the number of IO requests between extracting the one or more IO properties may be user-defined, a default number of IO requests, and/or defined automatically by tiering optimization process 10. In this manner, tiering optimization process 10 may limit the amount of processing of IO requests by sampling and processing a limited set of all of the IO requests received at the storage system.

For example, tablets/segments may be utilized for capturing the IO properties. Tiering optimization process 10 may utilize an active tablet and a frozen tablet; where an active tablet may store one or more IO properties currently being ingested and a frozen tablet may store one or more IO properties previously ingested. After a given interval (e.g., 1 hour) or when the active tablet is full, the active tablet may be swapped with the frozen table, such that it becomes the frozen tablet. The one or more IO properties may then be captured into a new active tablet which may be the previous frozen tablet. In this manner, a pair of tablets may be utilized as an active-frozen tablet pair configured to ingest the one or more IO properties on an active tablet and process the one or more IO properties from the frozen tablet. However, it will be appreciated that tiering optimization process 10 may utilize various data structures to ingest the one or more IO properties from the plurality of IO requests within the scope of the present disclosure.

Referring again to FIG. 4 and in some implementations, tiering optimization process 10 may extract 302 one or more IO properties from plurality of IO requests 400. For example, tiering optimization process 10 may extract 302 IO properties 418 from IO request 402; IO properties 420 from IO request 404; IO properties 422 from IO request 406; and IO properties 424 from IO request 408.

In some implementations, tiering optimization process 10 may generate 308 one or more machine learning features from the one or more IO properties. A machine learning feature may generally include various statistics associated with one or more storage objects that may be utilized by a machine learning model to predict the likelihood of future requests to access the one or more storage objects. Tiering optimization process 10 may analyze the raw IO properties extracted from the plurality of IO requests (e.g., IO properties 418, 420, 422, 424) to generate 308 features for machine learning (e.g., machine learning features 426, 428, 430, 432). In some implementations, since the duration of time for the extracted IO properties can vary, the generated machine learning features may be normalized for time (e.g., 1 hour).

As discussed above, with large storage systems, it may not be feasible to track and maintain machine learning features on a per-storage block basis (e.g., a 1 PB storage system may include 250 billion 4 KB blocks). Accordingly, the one or more machine learning features may be averaged and maintained on a per-storage extent basis (e.g., a 2 MB basis). In this manner, tiering optimization process 10 may generate 308 machine learning features for particular storage extents. For example, tiering optimization process 10 may generate 308 machine learning feature(s) 426 for storage extent 410; machine learning feature(s) 428 for storage extent 412; machine learning feature(s) 430 for storage extent 414; and machine learning feature(s) 432 for storage extent 416.

In some implementations, the one or more machine learning features may include: a re-access block count and one or more of: a re-access interval count for one or more blocks that have been re-accessed during a predefined interval; and a re-access time gap between re-accessing for the one or more blocks that have been re-accessed. For example, tiering optimization process 10 may generate 308 a re-access block count (e.g., the count of the number of blocks within a storage extent that have been re-accessed within a given interval). The re-access block count may give an indication of how the storage extent should be tiered. The interval may be user-defined, a default interval, and/or automatically defined by tiering optimization process 10.

For the blocks within a storage extent that are re-accessed within the above-described interval, tiering optimization process 10 may generate 308 a re-access interval count for the one or more blocks that have been re-accessed during a predefined interval. For example, tiering optimization process 10 may determine the average number of times the block has been re-accessed within a given interval. This machine learning feature may give an indication on whether tiering-based policies should be applied for this storage extent. As discussed above, the interval may be user-defined, a default interval, and/or automatically defined by tiering optimization process 10.

For blocks within a storage extent that are re-accessed within the above-described interval, tiering optimization process 10 may generate 308 a re-access time gap between re-accessing for the one or more blocks that have been re-accessed. For example, this may be the average duration of the time gap between re-accesses. This feature may give an indication about whether the storage extent would still be in a high performance storage tier when blocks within it are re-accessed or whether the storage extent should be down-tiered. The time gap may be normalized based on IO activity on the system (i.e., normalized for busy vs. idle system). While three examples of machine learning features have been provided, it will be appreciated that tiering optimization process 10 may generate 308 any number or type of machine learning features within the scope of the present disclosure.

As will be discussed in greater detail below, generating 308 one or more machine learning features from the one or more IO properties may include generating 310 the one or more machine learning features from the one or more IO properties using one or more machine learning models. For example, tiering optimization process 10 can train a classification model to infer the access pattern for each storage object (e.g. sequential, cyclic, or random). In this manner, tiering optimization process 10 may use a first machine learning model (not shown) to generate 310 the machine learning features for one or more storage objects. As will be discussed below, these machine learning features may be provided to another machine learning model configured to define an access temperature value for the one or more storage objects using the machine learning features generated 310 by the first machine learning model.

In some implementations, tiering optimization process 10 may process 304, using one or more machine learning models, the one or more IO properties to define an access temperature value for one or more storage objects of the storage system. For example, the one or more machine learning models may quantify an access temperature value of each storage extent, which may be correlated with storage system performance gain if a tiering operation to a particular tier (e.g., up-tiering/promotion to highest tier or down-tiering/demotion to lowest tier) is applied to that storage extent. In this manner, the access temperature value may be an indication of an access temperature associated with the storage object. For example, if a storage object is accessed more frequently, IO requests for that storage object will be most efficiently processed using a higher performance storage tier. By contrast, if a storage object is accessed infrequently, IO requests for that storage object may be efficiently processed using a lower performance storage tier.

As is known in the art, a machine learning model (e.g., machine learning model 434) may generally include an algorithm or combination of algorithms that has been trained to recognize certain types of patterns. For example, machine learning approaches may be generally divided into three categories, depending on the nature of the signal available: supervised learning, unsupervised learning, and reinforcement learning. As is known in the art, supervised learning may include presenting a computing device with example inputs and their desired outputs, given by a "teacher", where the goal is to learn a general rule that maps inputs to outputs. With unsupervised learning, no labels are given to the learning algorithm, leaving it on its own to find structure in its input. Unsupervised learning can be a goal in itself (discovering hidden patterns in data) or a means towards an end (feature learning). As is known in the art, reinforcement learning may generally include a computing device interacting in a dynamic environment in which it must perform a certain goal (such as driving a vehicle or playing a game against an opponent). As it navigates its problem space, the machine learning model is provided feedback that's analogous to rewards, which it tries to maximize. While three examples of machine learning approaches have been provided, it will be appreciated that other machine learning approaches are possible within the scope of the present disclosure.

In some implementations, one or more machine learning models may be used for regression. For example, ensemble methods such as Random Forrest (a collection of decision trees) may be candidates for these machine learning models because of their simplicity, speed, and lower risk of overfitting. However, it will be appreciated that the one or more machine learning models may utilize various types of machine learning algorithms for processing 304 the one or more IO properties to define an access temperature value for one or more storage objects of the storage system within the scope of the present disclosure.

In some implementations, the one or more machine learning models may be configured for one or more of: offline training and continuous training. Offline training may generally include a one-time or single training of the one or more machine learning models with training data that is performed separately from the processing of non-training data. Continuous training may generally include changing or updating the one or more machine learning models data comes in, e.g. with every "n"th IO request. Tiering optimization process 10 may also guide the training process to acquire more useful data using active learning. For example, tiering optimization process 10 can sample with higher frequency the storage objects in which the quality of the current model (measured by MSE, RMSE or similar metrics) is low.

In some implementations, tiering optimization process 10 may tier 306 the one or more storage objects between a plurality of storage tiers of the storage system, based upon, at least in part, the access temperature values defined for the one or more storage objects of the storage system and one or more tiering policies. Tiering 306 may generally include the movement or relocation of data from one storage tier to another storage tier based upon, at least in part, the frequency of data usage or the expected frequency of data usage. For example and as discussed above, different storage tiers may be designed for various performance levels. Using the specific example of SSDs, once data is identified as frequently used, the identified blocks of data may be moved in the background to the SSD rather than being copied, since the SSD is being utilized as a primary storage tier, not a look aside copy area. When the data is subsequently accessed, the IO requests directed to the data may occur at or near the native performance of the SSDs.

Tiering storage objects between a plurality of storage tiers may differ from caching data between a cache memory system and a backend memory system in many ways. For example, caching is typically applied on the physical level to individual blocks, while tiering is typically applied on a logical level to entire application datasets, such as a volume associated with a certain application, or even all data related to a certain customer. Additionally, caching policies are typically applied in a delayed, non-deterministic and stochastic manner, since whether a block will be discarded from the cache, and in general which blocks will reside in the cache and which will be discarded depends on the future flow of IOPs. Tiering policies on the other hand are typically applied immediately and in a deterministic manner. Further, tiering solutions can be scaled to a storage cluster, while caching is usually applicable to a single storage appliance. In addition, tiering solutions can be extended to cloud storage (e.g. as a backup tier), while caching is usually applicable to on premise storage. Accordingly, it will be appreciated that the process of tiering storage objects between storage tiers as described herein is fundamentally distinct from caching data in a cache memory system and flushing cached data to a backend memory system.

In some implementations, processing 304 the one or more IO properties to define an access temperature value for one or more storage objects of the storage system using one or more machine learning models may include assigning each storage object with an access temperature value indicative of a likelihood that a storage object will be accessed within a particular time frame. The access temperature may incorporate the number of IO requests performed against the storage object, as well as the number of bytes transferred, within the relevant time frame. For example, the access temperature value may include a read temperature, a write temperature, and/or a combination of a read and write temperature. That is, an access temperature value may indicate a likelihood that data may be read from a storage object and/or that data may be written to a storage object within a particular time frame. In some implementations, the access temperature value may be utilized by various tiering policies to optimize the tiering of the storage objects within the storage system. For example, the temperature prediction may enable various tiering policies that use the predicted temperature, along with other values such as the system parameters (e.g., the tiering hierarchy topology, sizes of various layers, etc.), to optimize (up or down) tiering decisions, resulting in a performance gain.

Figure 5:
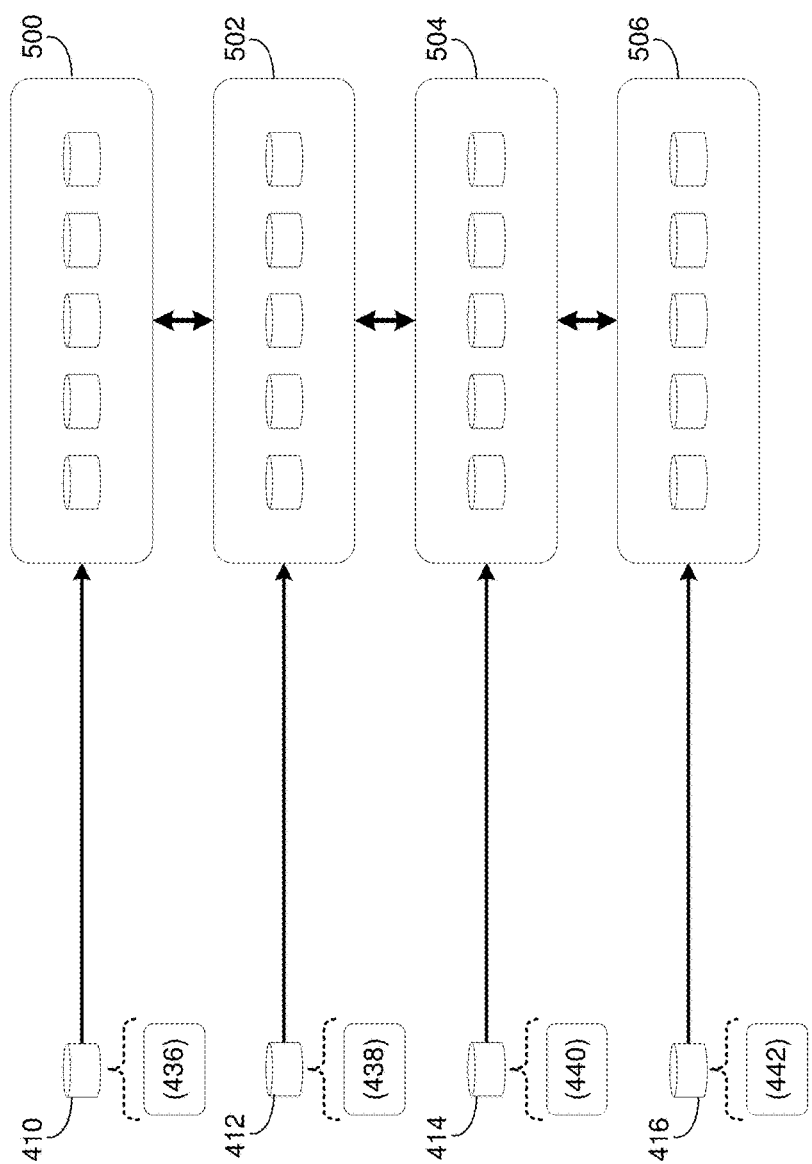

Referring also to FIG. 5 and in some implementations, suppose storage system 12 includes or has access to e.g., four different storage tiers (e.g., storage tiers 500, 502, 504, 506) with four different performance levels. For example, storage tier 500 may be associated with a high level performance storage tier (e.g., NVRAM); storage tier 502 may be associated with a mid-level performance storage tier (e.g., SSD); storage tier 504 may be associated with a low level performance storage tier (e.g., HDD); and storage tier 506 may be associated with an off premise, low level performance storage tier (e.g., cloud storage).

For example, storage tier 506 may include cloud storage tiering. Tiering optimization process 10 may provide data movement between on premise storage tiers (e.g., storage tiers 500, 502, 504) and private or public cloud storage (e.g., storage tier 506), and data movement between multiple cloud storage service types, by treating the cloud storage services as additional storage tiers with known retrieval times, transfer and storage costs, much like local media such as tape archives. Accordingly, tiering optimization process 10 may provide for tiering between any number of or type of storage tiers within the scope of the present disclosure.

As each storage object or storage extent may be accessed at various times and frequencies throughout the life cycle of the storage object, tiering optimization process 10 may tier or retier the storage object in various storage tiers corresponding to the degree that the storage object is accessed or predicted to be accessed. Accordingly, tiering optimization process 10 may define an access temperature value indicative of the likelihood that a storage object will be accessed within a particular time frame.

In some implementations, tiering optimization process 10 may define an access temperature value for a storage object based upon, at least in part, a quality of service (QoS) and/or a service level agreement (SLA) defined for the storage object. For example, suppose that each storage extent (e.g., storage extents 410, 412, 414, 416) is associated with a particular QoS value. In this example, tiering optimization process 10 may define higher access temperature values for storage extents with higher QoS values and lower access temperature values for storage extents with lower QoS values. Similarly, tiering optimization process 10 may define higher access temperature values for storage extents with higher SLA values and lower access temperature values for storage extents with lower SLA values.

In one example, the access temperature value may be a numerical value (e.g., ranging from 0 to 1) indicative of the likelihood that a storage object will be accessed within a particular time frame. Referring again to the example of FIG. 4 and in some implementations, suppose tiering optimization process 10 determines, using machine learning model 434, that storage object 410 is accessed frequently at all times (e.g., based upon, at least in part, processing 304 machine learning feature 426 using machine learning model 434). In this example, tiering optimization process 10 may define a high access temperature value (e.g., access temperature value 436 of about 1) as storage extent 410 is extremely likely to be accessed within a predefined time frame. Accordingly, tiering storage extent 410 in a higher performing storage tier may provide an expected performance gain for storage system by not wasting CPU cycles and processing power retiering storage extent 410 between the highest performance storage tiers and lower performing storage tiers.

Further suppose that tiering optimization process 10 determines, using machine learning model 434, that storage object 412 is accessed somewhat frequently at all times (e.g., based upon, at least in part, processing 304 machine learning feature 428 using machine learning model 434). In this example, tiering optimization process 10 may define a moderate access temperature value (e.g., access temperature value 438 of about 0.55) as storage extent 412 is likely to be accessed within a predefined time frame. Accordingly, tiering storage extent 412 in a higher performing storage tier may provide moderate performance gain for storage system 12.

In another example, suppose that tiering optimization process 10 determines, using machine learning model 434, that storage object 414 is accessed somewhat infrequently at any given time (e.g., based upon, at least in part, processing 304 machine learning feature 430 using machine learning model 434). In this example, tiering optimization process 10 may define a lower access temperature value (e.g., access temperature value 440 of about 0.3) as storage extent 414 is unlikely to be accessed within a predefined time frame. Accordingly, tiering storage extent 414 in a higher performing storage tier may provide minor performance gain for storage system 12.

Suppose that tiering optimization process 10 determines, using machine learning model 434, that storage object 416 is never accessed or is very rarely accessed (e.g., based upon, at least in part, processing 304 machine learning feature 432 using machine learning model 434). In this example, tiering optimization process 10 may define a minimum access temperature value (e.g., access temperature value 442 of about 0) as storage extent 416 is extremely unlikely to be accessed. Accordingly, tiering storage extent 416 in a higher performing storage tier may provide no performance gain for storage system 12.

In some implementations, tiering optimization process 10 may define access temperature values for the one or more storage objects that account for predicted access patterns to the data of the one or more storage objects. For example, some access patterns for particular storage objects may exhibit time-related characteristics. When the applications that generated the relevant IO requests run at particular times (e.g., at night, on weekend, on the $1^{st}$ day of every month, etc.), tiering optimization process 10 may apply time-series analysis to forecast the expected access temperature value of storage objects at some future date. Such analysis may help adapt to seasonality or periodicity in the IO access patterns of different storage extents in the storage system and may optimize tiering policies accordingly. For example, suppose that tiering optimization process 10 determines that storage object 414 is accessed at the end of each quarter of the year. In this example, tiering optimization process 10 may define the access temperature value (e.g., access temperature value 440) as a function of time such that access temperature value 440 is lower (e.g., a value of 0.3) for periods of time not at the end of a quarter and is higher (e.g., a value of 1) for periods of time at the end of each quarter.

In another example, tiering optimization process 10 may utilize past access temperature values to predict a future access temperature values for a storage object. For example, tiering optimization process 10 may determine a simple moving average (SMO) and/or an exponential moving average (EMO) to define the access temperature value for a storage object. However, it will be appreciated that tiering optimization process 10 may determine future access temperature values for storage objects using other statistical or probability-based determinations within the scope of the present disclosure.

A tiering policy may generally include a rule or portion of logic that determines how a storage object is tiered within a storage system. Tiering policies may be user-defined and/or automatically define by tiering optimization process 10. As discussed above, tiering policies may utilize the access temperature value defined by the one or more machine learning models along with other system parameters (e.g., the tiering hierarchy topology, sizes of various layers, etc.), to optimize tiering decisions. For example, tiering policies may define when to promote or up-tier particular storage objects to a higher performance storage tier based upon, the access temperature value defined for the storage objects and performance characteristics of the storage system. Similarly, tiering policies may define when to demote or down-tier particular storage objects to a lower performance storage tier based upon, the access temperature value defined for the storage objects and performance characteristics of the storage system. In this manner, tiering optimization process 10 may optimize the tiering of storage objects by enabling particular tiering policies for specific storage objects using the access temperature values defined for the storage objects.

In some implementations, tiering 306 the one or more storage objects between a plurality of storage tiers of the storage system, based upon, at least in part, the access temperature values defined for the one or more storage objects of the storage system may and one or more tiering policies include defining 312 a plurality of tiering thresholds for the plurality of storage tiers based upon, at least in part, the access temperature values defined for the one or more storage objects. As discussed above, various access temperature values may be defined for the one or more storage objects. Tiering optimization process 10 may utilize the access temperature values to determine which storage tier of a plurality of storage tiers to tier the one or more storage objects to. For example, tiering optimization process 10 may define 312 a plurality of tiering thresholds for the plurality of storage tiers using the access temperature values for the one or more storage objects. As will be discussed in greater below, the plurality of tiering thresholds may indicate which storage tier to tier storage objects within.

Figure 6:
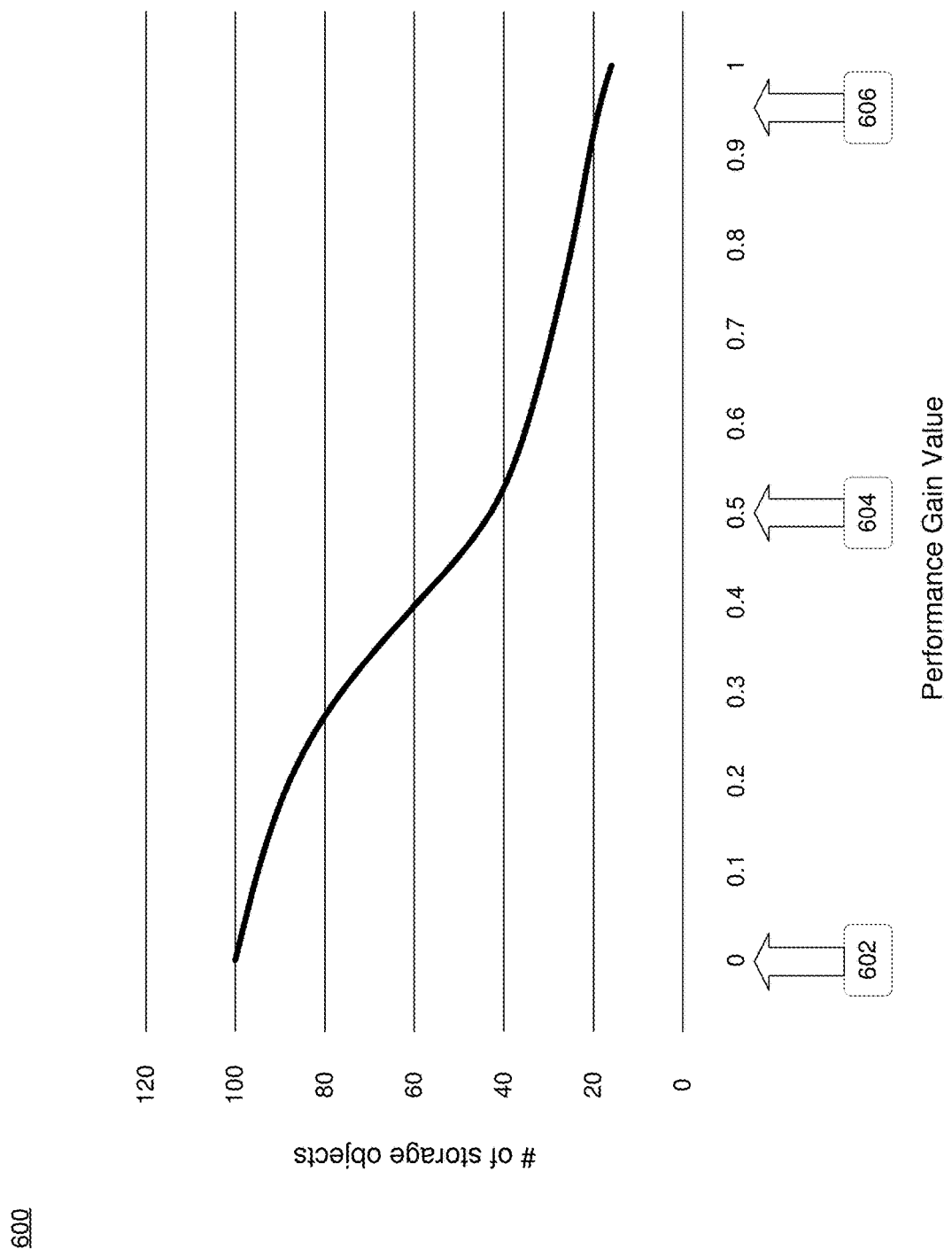
FIG. 6 is a graph showing a distribution of storage objects across a plurality of storage tiers as a function of an access temperature value with a plurality of tiering thresholds.

Referring also to the example of FIG. 6, a distribution of a plurality of storage objects in a storage system is shown across a range of access temperature values (e.g., distribution 600). Tiering optimization process 10 may define 312 a plurality of tiering thresholds (e.g., tiering thresholds 602, 604, 606) based upon, at least in part, the access temperature values for the one or more storage objects. For example, tiering optimization process 10 may define a first tiering threshold (e.g., tiering threshold 602) for "cold" storage extents; a second tiering threshold (e.g., tiering threshold 604) for "warm" storage extents; and a third tiering threshold (e.g., tiering threshold 606) for "hot" storage extents. While an example of three tiering thresholds has been described (e.g., "cold", "warm", and "hot" thresholds), it will be appreciated that tiering optimization process 10 may define 312 any number of tiering thresholds within the scope of the present disclosure.

Tiering optimization process 10 may define 312 the number of and/or values of the plurality of tiering thresholds in terms of access temperature values based upon, at least in part, a defined capacity for each storage tier, the performance capability of each storage tier, the number of storage tiers, and/or data efficiency operations associated with storage of data on a particular storage tier (e.g., data compression, data deduplication, etc. associated with each storage tier). The tiering threshold for each storage tier may be defined with an initial threshold, a default threshold, a user-defined threshold (e.g., input via a user interface), and/or may be an automatically defined threshold (e.g., generated by tiering optimization process 10).

Referring again to the example of FIG. 5 and in some implementations, suppose tiering optimization process 10 defines, using machine learning model 434, a high access temperature value (e.g., access temperature value 436 of about 1) for storage extent 410. Referring again to the example of FIG. 6, suppose tiering optimization process 10 defines 312 three tiering thresholds (e.g., tiering thresholds 602, 604, 606). In this example, suppose that tiering threshold 606 defines the threshold (e.g., an access temperature value of at least 0.95) for tiering storage objects in a high level performance storage tier (e.g., storage tier 500); tiering threshold 604 defines the threshold (e.g., an access temperature value of at least 0.5) for tiering storage objects in a mid-level performance storage tier (e.g., storage tier 502); and tiering threshold 602 defines the threshold (e.g., an access temperature value of greater than 0) for tiering storage objects in a low level performance storage tier (e.g., storage tier 504). Accordingly, tiering optimization process 10 may tier 306 storage extent 410 into storage tier 500 based upon, at least in part, access temperature value 436 of about 1 defined for storage extent 410 (e.g., as access temperature value 436 is greater than tiering threshold 600, tiering threshold 602, and tiering threshold 604).

Further suppose that tiering optimization process 10 defines, using machine learning model 434, a moderate access temperature value (e.g., access temperature value 438 of about 0.55) for storage extent 412. In this example, tiering optimization process 10 may tier 306 storage extent 412 into storage tier 502 based upon, at least in part, access temperature value 438 of about 0.5 defined for storage extent 412 (e.g., as access temperature value 438 is greater than tiering threshold 600 and tiering threshold 602 but is less than tiering threshold 604).

In another example, suppose that tiering optimization process 10 defines, using machine learning model 434, a low access temperature value (e.g., access temperature value 440 of about 0.3) for storage extent 414. In this example, tiering optimization process 10 may tier 306 storage extent 414 into storage tier 504 based upon, at least in part, access temperature value 440 of about 0.3 defined for storage extent 414 (e.g., as access temperature value 440 is greater than tiering threshold 600 but is less than tiering threshold 602 and tiering threshold 604).

Suppose that tiering optimization process 10 defines, using machine learning model 434, a minimum access temperature value (e.g., access temperature value 442 of 0) for storage extent 416 because storage extent 416 is unlikely to be accessed in the near future, if at all. In this example, tiering optimization process 10 may tier 306 storage extent 416 into storage tier 506 based upon, at least in part, access temperature value 442 of about 0 defined for storage extent 416. In this example, tiering optimization process 10 may utilize an additional tiering threshold (e.g., an access temperature value of less than 0) to determine when to tier storage objects to storage tier 506.

In some implementations, tiering 306 the one or more storage objects between a plurality of storage tiers of the storage system, based upon, at least in part, the access temperature values defined for the one or more storage objects of the storage system may include dynamically adjusting 314 the plurality of tiering thresholds for the plurality of storage tiers based upon, at least in part, performance of the plurality of storage tiers. For example, tiering optimization process 10 may dynamically and continuously adjust 314 the plurality of tiering thresholds using a feedback-loop to maximize one or more goal functions (e.g. minimize access time, etc.). The plurality of tiering thresholds may dynamically adjust 314 for changes in storage system performance; storage system configurations (e.g., number and types of storage tiers); and/or the sizing/capacity of the storage tiers (i.e., an amount of NVRAM, SSD and HDD capacity in the storage system). In this manner, tiering optimization process 10 may dynamically adjust 314 the plurality of tiering thresholds for the plurality of storage tiers by monitoring the performance of the plurality of storage tiers.

Referring again to FIG. 5 and as discussed above, tiering optimization process 10 may tier 306 storage object 410 within storage tier 500 based upon, at least in part, access temperature value 436 defined for storage object 410; storage object 412 within storage tier 502 based upon, at least in part, access temperature value 438 defined for storage object 412; storage object 414 within storage tier 504 based upon, at least in part, access temperature value 440 defined for storage object 414; and storage object 416 within storage tier 506 based upon, at least in part, access temperature value 442 defined for storage object 416. However, suppose that the capacity of storage tier 502 (e.g., a mid-level performance storage tier) reaches a maximum threshold. Tiering optimization process 10 may dynamically adjust 314 the tiering threshold for storage tier 502 by increasing the tiering threshold associated with storage tier 502 (e.g., tiering threshold 604) such that fewer storage objects have at least the threshold access temperature value required to tier the storage object in storage tier 502. In this manner, tiering optimization process 10 may reduce the number of storage objects being stored in or tiered to storage tier 502.

In another example, suppose that tiering optimization process 10 determines that the storage cost associated with storage tier 500 has risen (e.g., based upon, at least in part, a total storage cost associated with storage tier 500 exceeding a cost threshold associated with storage tier 500). In this example, tiering optimization process 10 may dynamically adjust 314 the tiering threshold for storage tier 500 by increasing the tiering threshold of storage tier 500 (e.g., tiering threshold 606) such that fewer storage objects have at least the threshold access temperature value required to tier the storage object in storage tier 500. In this manner, tiering optimization process 10 may reduce the number of storage objects being stored in or tiered to storage tier 500 until a total storage cost associated with storage tier 500 is brought below a cost threshold associated with storage tier 500. Accordingly, tiering optimization process 10 may dynamically adjust 314 the plurality of tiering thresholds for the plurality of storage tiers based upon, at least in part, performance of the plurality of storage tiers (e.g., capacity of storage tiers, costs of storage tiers, etc.).

General:

As will be appreciated by one skilled in the art, the present disclosure may be embodied as a method, a system, or a computer program product. Accordingly, the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present disclosure may take the form of a computer program product on a computer-usable storage medium having computer-usable program code embodied in the medium.

Any suitable computer usable or computer readable medium may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium may include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. The computer-usable or computer-readable medium may also be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to the Internet, wireline, optical fiber cable, RF, etc.

Computer program code for carrying out operations of the present disclosure may be written in an object oriented programming language such as Java, Smalltalk, C++ or the like. However, the computer program code for carrying out operations of the present disclosure may also be written in conventional procedural programming languages, such as the "C" programming language or similar programming languages. The program code may execute entirely on the user's computer, partly on the user's computer, as a standalone software package, partly on the user's computer and partly on a remote computer or entirely on the remote computer or server. In the latter scenario, the remote computer may be connected to the user's computer through a local area network/a wide area network/the Internet (e.g., network 14).

The present disclosure is described with reference to flowchart illustrations and/or block diagrams of methods, apparatus (systems) and computer program products according to implementations of the disclosure. It will be understood that each block of the flowchart illustrations and/or block diagrams, and combinations of blocks in the flowchart illustrations and/or block diagrams, may be implemented by computer program instructions. These computer program instructions may be provided to a processor of a general purpose computer/special purpose computer/other programmable data processing apparatus, such that the instructions, which execute via the processor of the computer or other programmable data processing apparatus, create means for implementing the functions/acts specified in the flowchart and/or block diagram block or blocks.

These computer program instructions may also be stored in a computer-readable memory that may direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

The flowcharts and block diagrams in the figures may illustrate the architecture, functionality, and operation of possible implementations of systems, methods and computer program products according to various implementations of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, may be implemented by special purpose hardware-based systems that perform the specified functions or acts, or combinations of special purpose hardware and computer instructions.

The terminology used herein is for the purpose of describing particular implementations only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various implementations with various modifications as are suited to the particular use contemplated.

A number of implementations have been described. Having thus described the disclosure of the present application in detail and by reference to implementations thereof, it will be apparent that modifications and variations are possible without departing from the scope of the disclosure defined in the appended claims.

What is claimed is:

1. A computer-implemented method, executed on a computing device, comprising:
   receiving a plurality of input/output (IO) requests at a storage system;
   extracting one or more IO properties from the plurality of IO requests;
   processing, using one or more machine learning models, the one or more IO properties to define an access temperature value for one or more storage objects of the storage system, wherein the access temperature value indicates a likelihood that a storage object will be accessed within a particular future time frame; and
   tiering the one or more storage objects between a plurality of storage tiers of the storage system, based upon, at least in part, the access temperature values defined for the one or more storage objects of the storage system and one or more tiering policies.

2. The computer-implemented method of claim 1, further comprising:
   generating one or more machine learning features from the one or more IO properties.

3. The computer-implemented method of claim 2, wherein generating the one or more machine learning features from the one or more IO properties includes generating the one or more machine learning features from the one or more IO properties using one or more machine learning models.

4. The computer-implemented method of claim 2, wherein the one or more machine learning features include:
   a re-access block count; and
   one or more of:
      a re-access interval count for one or more blocks that have been re-accessed during a predefined interval; and
      a re-access time gap between re-accessing for the one or more blocks that have been re-accessed.

5. The computer-implemented method of claim 1, wherein tiering the one or more storage objects between a plurality of storage tiers of the storage system, based upon, at least in part, the access temperature values defined for the one or more storage objects of the storage system includes defining a plurality of tiering thresholds for the plurality of storage tiers based upon, at least in part, the access temperature values defined for the one or more storage objects.

6. The computer-implemented method of claim 5, wherein tiering the one or more storage objects between a plurality of storage tiers of the storage system, based upon, at least in part, the access temperature values defined for the one or more storage objects of the storage system includes dynamically adjusting the plurality of tiering thresholds for the plurality of storage tiers based upon, at least in part, performance of the plurality of storage tiers.

7. The computer-implemented method of claim 1, wherein the one or more machine learning models are configured for one or more of: offline training and continuous training.

8. A computer program product residing on a non-transitory computer readable medium having a plurality of instructions stored thereon which, when executed by a processor, cause the processor to perform operations comprising:
  receiving a plurality of input/output (IO) requests at a storage system;
  extracting one or more IO properties from the plurality of IO requests;
  processing, using one or more machine learning models, the one or more IO properties to define an access temperature value for one or more storage objects of the storage system, wherein the access temperature value indicates a likelihood that a storage object will be accessed within a particular future time frame; and
  tiering the one or more storage objects between a plurality of storage tiers of the storage system, based upon, at least in part, the access temperature values defined for the one or more storage objects of the storage system and one or more tiering policies.

9. The computer program product of claim 8, wherein the operations further comprise:
  generating one or more machine learning features from the one or more IO properties.

10. The computer program product of claim 9, wherein generating the one or more machine learning features from the one or more IO properties includes generating the one or more machine learning features from the one or more IO properties using one or more machine learning models.

11. The computer program product of claim 9, wherein the one or more machine learning features include:
  a re-access block count; and
  one or more of:
    a re-access interval count for one or more blocks that have been re-accessed during a predefined interval; and
    a re-access time gap between re-accessing for the one or more blocks that have been re-accessed.

12. The computer program product of claim 8, wherein tiering the one or more storage objects between a plurality of storage tiers of the storage system, based upon, at least in part, the access temperature values defined for the one or more storage objects of the storage system includes defining a plurality of tiering thresholds for the plurality of storage tiers based upon, at least in part, the access temperature values defined for the one or more storage objects.

13. The computer program product of claim 11, wherein tiering the one or more storage objects between a plurality of storage tiers of the storage system, based upon, at least in part, the access temperature values defined for the one or more storage objects of the storage system includes dynamically adjusting the plurality of tiering thresholds for the plurality of storage tiers based upon, at least in part, performance of the plurality of storage tiers.

14. The computer program product of claim 8, wherein the one or more machine learning models are configured for one or more of: offline training and continuous training.

15. A computing system comprising:
  a memory; and
  a processor configured to receive a plurality of input/output (IO) requests at a storage system, wherein the processor is further configured to extract one or more IO properties from the plurality of IO requests, wherein the processor is further configured to generate one or more machine learning features from the one or more IO properties, wherein the one or more machine learning features include: a re-access block count, and one or more of: a re-access interval count for one or more blocks that have been re-accessed during a predefined interval, and a re-access time gap between re-accessing for the one or more blocks that have been re-accessed, wherein the processor is further configured to process, using one or more machine learning models, the one or more IO machine learning features to define an access temperature value for one or more storage objects of the storage system, and wherein the processor is further configured to tier the one or more storage objects between a plurality of storage tiers of the storage system, based upon, at least in part, the access temperature values defined for the one or more storage objects of the storage system and one or more tiering policies.

16. The computing system of claim 15, wherein generating the one or more machine learning features from the one or more IO properties includes generating the one or more machine learning features from the one or more IO properties using one or more machine learning models.

17. The computing system of claim 15, wherein tiering the one or more storage objects between a plurality of storage tiers of the storage system, based upon, at least in part, the access temperature values defined for the one or more storage objects of the storage system includes defining a plurality of tiering thresholds for the plurality of storage tiers based upon, at least in part, the access temperature values defined for the one or more storage objects.

18. The computing system of claim 15, wherein tiering the one or more storage objects between a plurality of storage tiers of the storage system, based upon, at least in part, the access temperature values defined for the one or more storage objects of the storage system includes dynamically adjusting the plurality of tiering thresholds for the plurality of storage tiers based upon, at least in part, performance of the plurality of storage tiers.

* * * * *